United States Patent
Patterson

[15] 3,648,513
[45] Mar. 14, 1972

[54] SONIC METHOD AND MEANS FOR DETERMINATION OF SOLUTION CONCENTRATIONS

[72] Inventor: Gerald D. Patterson, Tulsa, Okla.
[73] Assignee: The Dow Chemical Company, Midland, Mich.
[22] Filed: Jan. 5, 1970
[21] Appl. No.: 733

[52] U.S. Cl. ................................................73/53, 73/61.1 R
[51] Int. Cl. ...........................................................G07n 29/02
[58] Field of Search .................................73/53, 61.1 R, 61 R

[56] References Cited

UNITED STATES PATENTS

| 2,756,404 | 7/1956 | Anderson et al. | 73/53 X |
| 2,750,794 | 6/1956 | Downs | 73/53 |
| 3,392,574 | 7/1968 | Lemon et al. | 73/53 |

*Primary Examiner*—Louis R. Prince
*Assistant Examiner*—Joseph W. Roskos
*Attorney*—Griswold & Burdick and Earl D. Ayers

[57] ABSTRACT

This invention relates to a method of determining the chemical concentration of a solution. More particularly, the invention relates to determining the chemical concentration of a solution by measuring the speed of sound transmission, the temperature, and the hydrostatic pressure of the solution, and conveying these measurements to an analog computer wherein the chemical concentration is ascertained from preestablished empirical formulas.

4 Claims, 3 Drawing Figures

Patented March 14, 1972

INVENTOR.
GERALD D. PATTERSON

BY *Griswold & Burdick*

ATTORNEYS

INVENTOR.
GERALD D. PATTERSON
BY
Griswold & Burdick
ATTORNEYS

INVENTOR.
GERALD D. PATTERSON
BY
Griswold & Burdick
ATTORNEYS

SONIC METHOD AND MEANS FOR DETERMINATION OF SOLUTION CONCENTRATIONS

BACKGROUND AND SUMMARY OF THE INVENTION

A problem frequently encountered in industry, particularly in solution mining and chemical processing, is to readily ascertain the level of chemical concentration of a solution. In solution mining the problem is amplified by the fact that in a large cavern area the degree of chemical concentration frequently varies greatly from one level to another. Therefore merely extracting a sample from one the cavern and ascertaining the degree of concentration in the laboratory does not provide the engineer with all the information he needs. In solution mining strata of concentration levels often occur and this is particularly true in the mining arrangement wherein the fluid inlet opening and the fluid outlet opening are spaced at a distance from each other. Frequently, strata, or paths of fluid flow occur between the inlet and outlet openings which result in inefficient operation since the fluids containing the maximum concentrations are not being forced through the outlet opening. When this situation is accurately known it can frequently be corrected by changing the locations of the inlet and outlet openings or by varying the elevations of the openings, such as by extending inlet or outlet pipes farther into the cavern. In chemical processes the change of parameters of the process can materially change chemical concentrations of fluids flowing in different portions of the process. For process control it is frequently important that a changing chemical concentration be monitored and continuously recorded. This requirement obviously is substantially impossible to satisfy merely by sample extraction and laboratory evaluation.

An object of this invention is to provide a method and apparatus for determining the chemical concentration of a solution.

More particularly, an object of this invention is to provide a method of determining the concentration of a solution including means of plotting the level of concentration on a chart relative to time, depth, so forth.

These general objects, as well as more specific objects of the invention will be understood by references to the description and claims, taken in conjunction with the drawings.

DESCRIPTION OF THE VIEWS

DETAILED DESCRIPTION

Figure 1:
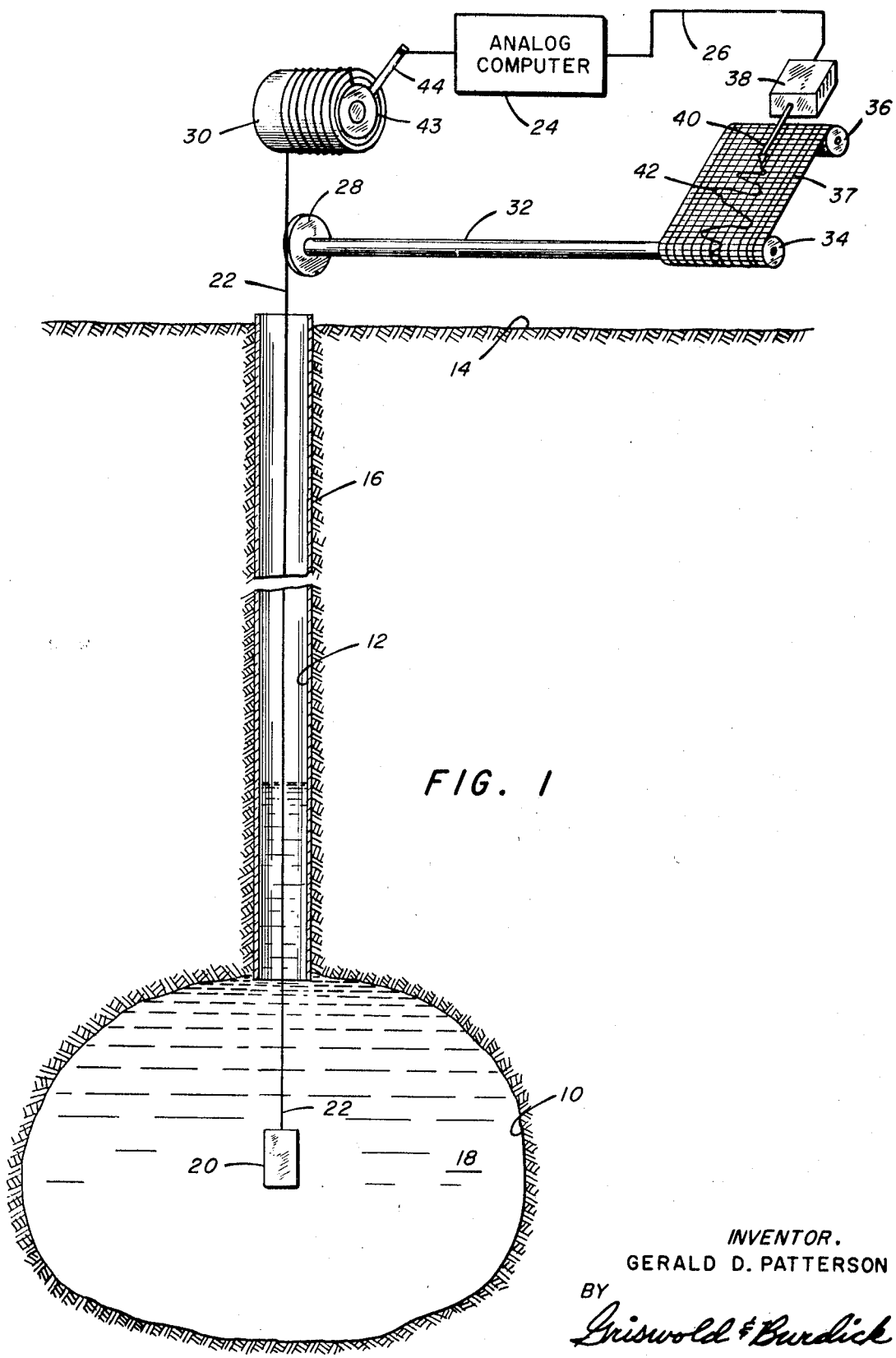
FIG. 1 is a diagrammatic representation of means of practicing the method of this invention to plot on a moving graph the level of concentration of a solution in an underground cavern relative to the depth of the cavern.

Referring first to FIG. 1, the apparatus for practicing a method of this invention as it is particularly applicable to an underground cavern is shown. Cavern 10 is formed in a soluble mineral deposit in the earth. A borehole 12 communicates between the earth's surface 14 and the cavern, the borehole receiving a casing 16 therein.

By apparatus and methods not illustrated, cavern 10 may be of the type in which solution mining is practiced. When such mining is practiced from a single borehole 12 the normal procedure includes the injection of fluid down through a tubing (not shown) positioned within the casing 16. The solution injected through such tubing dissolves minerals making up the wall of the cavern 12 and the solution containing such dissolved material is removed either by flowing up the annulus between the injection tubing and casing 16, or through an outlet tubing (also not shown). Regardless of the method utilized for solution mining cavern 10 frequently there will arise the problem of determining the level of concentration of chemicals in the solution 18. Obviously one method of determining the level of concentration is to lower an apparatus within the casing 16 to take an actual sample of the solution. Such means is satisfactory only if the solution at one level is required, that is, the level at which the sample container is filled. Even then, however, the determination of concentration by physically removing a sample is difficult. Such arrangement requires apparatus to be lowered into the hole, and the apparatus must include means of opening a container and closing a container controllable from the surface. In addition, in the laboratory it is sometimes difficult to make an accurate computation of the concentration as it actually exists in the cavern since the exact conditions of temperature and pressure in the cavern are difficult to reproduce in the laboratory or, corollary, it is difficult to make proper allowances for the different pressure and temperature of the sample in the laboratory compared to the actual condition of the solution 18 in the cavern.

An additional, and perhaps more important, problem in determining the concentration of solution 18 is that the concentration frequently varies considerably from one level to another. This is particularly true in solution mining wherein liquids of low concentration are introduced in the cavern and liquids of higher concentrations are removed since flow paths between the inlet and outlet openings tend to develop in which the level of concentration is much lower than the level either above or below such flow path strata. In order to most economically govern the elevation of the inlet and outlet openings communicating with cavern 10, and to control the shape of the cavern, it is frequently necessary for the operating engineer to know accurately the level of concentration of the solution at different elevations within the cavern. This can be accomplished, as previously mentioned, by taking physical samples of the solution at various elevations and computing the level of concentration in a laboratory, however, this is difficult, expensive, and time consuming. This invention provides, in one embodiment, a means for remotely indicating the level of concentration of a solution and includes means of plotting the level of concentration versus elevation of the solution.

It is known that the velocity of sound in a solution varies according to the level of concentration. This invention makes use of such phenomena. In addition to the level of concentration, the velocity of sound is also affected by the solution temperature and pressure. The relationship of temperature, pressure, and concentration on the speed of sound can be determined empirically for various solutions. For instance, in a solution of NaCl in water, the velocity of sound is determined by the empirical relationship $C = 4422 + 11.25T - 0.045T^2 + 0.018D + 4.3 (SAL-34)$ where:

$C$ = Velocity of sound in ft./sec.
$T$ = Solution temperature in °F.
$D$ = Hydrostatic head of solution in ft. of water.
$SAL$ = Salinity in parts per thousand.

A similar empirical formula maybe developed for the velocity of sound for other solutions.

This invention makes use of the above-described empirical relationship utilizing the apparatus shown in FIG. 1. Numeral 20 depicts a test instrument including means of determining the speed of sound transmission, the temperature, and the pressure of solution 18. These three measurements are conveyed by way of cable 22 to an analog computer 24 wherein the measurements provide, according to preestablished empirical formulas, an output analog signal on conductor 26 representative of the concentration of solution 18. In the illustrated arrangement of FIG. 1, means is provided for charting the concentration level in relation to depth. Multiconductor cable 22 engages a wheel 28 as the cable is wound or unwound on rotatable drum 30. By means of shaft 32 extending from wheel 28 to a paper drive roller 34 chart paper 36 extending from the drive roller to a takeup roller 38 moves in response to the elevational displacement of instrument 20. A writing device 38 responsive to the analog signal on conductor 26, and having a pen 40, provides a graphical indication 42 on chart 36 of the level of concentration of solution 18 relative to elevation.

The drum 30 includes slipring means 43 and brush means 44 as an indication of an arrangement wherein the signals from instrument 20 are conveyed to analog computer 24.

Figure 2:
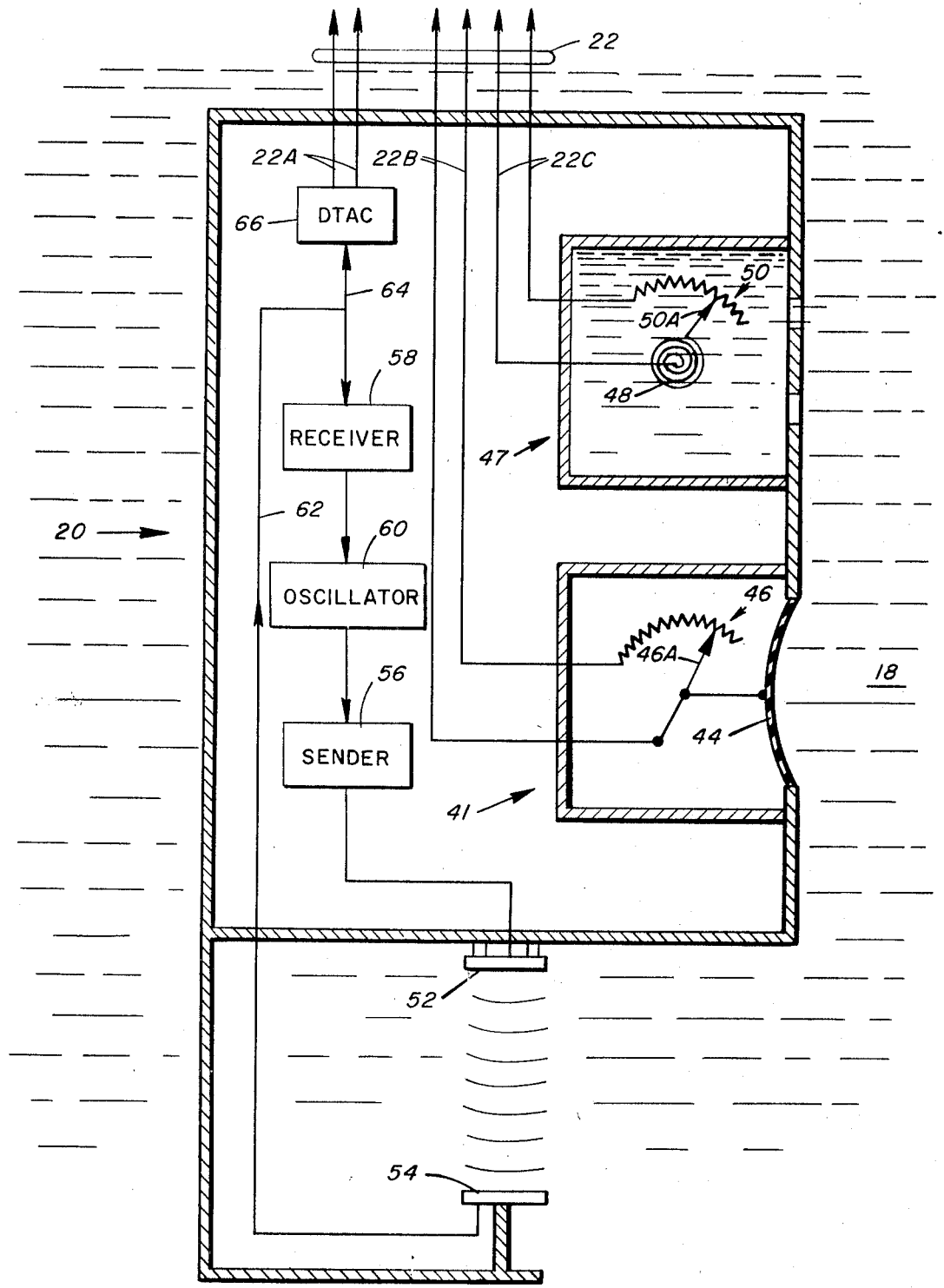
FIG. 2 is a diagrammatic representation of the components making up a test instrument as utilized in practicing the method of this invention.

FIG. 2 shows rudiments of the elements making up instrument 20. It is to be understood that FIG. 2 is not intended to depict the configuration of an actual instrument 20 but only indicates generally the contents of such instrument. In the illustration of FIG. 2 the analog signals necessary to determine the level of concentration of the fluid 18 in which the instrument is located are conveyed to the earth's surface by three pairs of conductors which together make up cable 22. Conductors 22A convey the speed of sound transmission signal 22B, the hydrostatic head pressure signal, and 22C, the temperature signal.

The analog signal on conductors 22B representative of the hydrostatic head may be achieved any type of pressure transponder which in FIG. 2 is diagrammatically represented by a diaphragm 44 which is distended in proportion to the pressure of the fluid 18, the distention of the diaphragm serving to move the contact point 46A of a potentiometer 46 so that appearing across pairs of conductors 22B is a variable resistance representative of the hydrostatic pressure. With voltage applied between conductors 22B, a current flow is achieved which is representative of the hydrostatic head pressure. Such variable current flow or voltage drop across potentiometer 46 then constitute an analog signal usable by computer 24 for the purposes of determining the level of concentration of solution 18.

An analog signal representative of the temperature of solution 18 may be obtained by many different forms of transponders, represented in FIG. 2 by a bimetallic element 48 which moves a contact point 50A on a potentiometer 50 to provide across conductors 22C a varying resistance representative of the temperature of the solution. Voltage applied across conductor pairs 22C provides varying current flow or varying voltage drop which is an analog signal of the solution temperature.

The pressure transponder 41 and temperature transponder 47 may be of a variety of arrangements and configurations which are readily commercially available and of types not necessarily incorporating the elements illustrated in FIG. 2.

Carried by the instrument 20 in an arrangement wherein the solution 18 completely permeates the space therebetween, is a transmitting element 52 and a receiving element 54. The elements 52 and 54 are typically crystals, the transmitting crystal 52 functioning to impart sound pulses in the solution actuated by a voltage pulse and the receiving element 54 functioning in the obverse, that is, to generate an electrical pulse when the sound pulses having passed through the solution are received.

Electrically connected both to the transmitting element 52 and the receiving element 54 is a speed of sound system which functions to receive the electrical pulse from receiving element 54 and to instantaneously self-regenerate a voltage pulse to actuate sending element 52, thereby to establish a self-regenerated pulse repetition frequency signal. In the typical arrangement the speed of sound system consists of a sender 56 having electrical connection to the transmitting element 52; a receiver 58 having electrical connection to the receiving element 54; and an oscillator 60 having electrical connection to both the sender 56 and receiver 58. The oscillator 60 The oscillator when energized, to initiate sequential voltage pulses. The pulse output is connected to the sender 56 which functions in the nature of an amplifier providing output pulses to actuate transmitting element 52. Receiver 58 functions to receive and shape the electrical signal from the receiving element and at the output thereof to actuate oscillator 60. When the speed of sound system is energized, oscillator 60 initiates a pulse which is amplified by sender 56 to actuate the transmitting element 52 causing a sound wave pulse in the solution.

This sound pulse travels to the receiving element 54 which converts the sound pulse into an electrical pulse which is amplified by receiver 58 and in turn actuates oscillator 60. The received pulse after suitable amplification and reshaping is again applied by way of the oscillator 60 to the sender 56, thus the speed of sound system regenerates and establishes a pulse repetition frequency the rate of which depends on the speed of sound traveling from the transmitter element 52 to the receiving element 54. Of course there may be some electrical and other delays, however, such delays are inconsequential when proper circuit parameters are used.

In a typical arrangement the transmitting element 52 and receiving element 54 may be placed exactly 6 inches apart. Oscillator 60 is set to have a normal period of oscillation of 3,500 cycles per second which is substantially below the pulse repetition frequency of any solution to be encountered in operation. In most solutions such as brine, the pulse repetition frequency of speed of sound system with the elements 52 and 54 6 inches apart is in the neighborhood of 13,000 cycles per second. Thus, the oscillator 60 functions primarily as a means of initiating the regenerative cycle of the speed of sound system.

The pulse electrical signal generated by the receiver element 54 in response to a sound pulse traveling through solution 18, is carried by conductor 62 back to receiver 58 as previously described to regenerate the transmission of a subsequent pulse and thereby establish a pulse repetition frequency signal exactly proportional to the speed of sound of the solution 18. This signal is also applied by way of conductor 64 to a digital-to-analog converter 66. In converter 66 the pulse repetition frequency signal, being a digital signal having a frequency rate proportional to the speed of sound transmission of the solution 18, is converted into an analog signal carried to the surface by conductors 22A. The analog signal on conductors 22A is thus proportional to the speed of sound transmission of the solution. The analog signal may be in the form of varying voltage, varying current, and so forth, depending upon the type of digital-to-analog converter 66 utilized, it being understood that the specific arrangement of the digital-to-analog converter is not a part of this invention, the same being well known in the art and commercially available. It can be seen that if desired, the digital signal appearing at conductor 64 may be carried by cable 22 to the earth's surface and the digital-to-analog converter 66 located at the earth's surface rather than in the instrument 20. Such arrangement is a design option.

Thus it can be seen that instrument 20, as diagrammatically illustrated in FIG. 2, provides three analog signals representing the temperature, pressure, and speed of sound transmission of solution 18. These are fed to analog computer 64 to provide, on output conductor 26, a signal representative of the level of concentration of solution 18.

Figure 3:
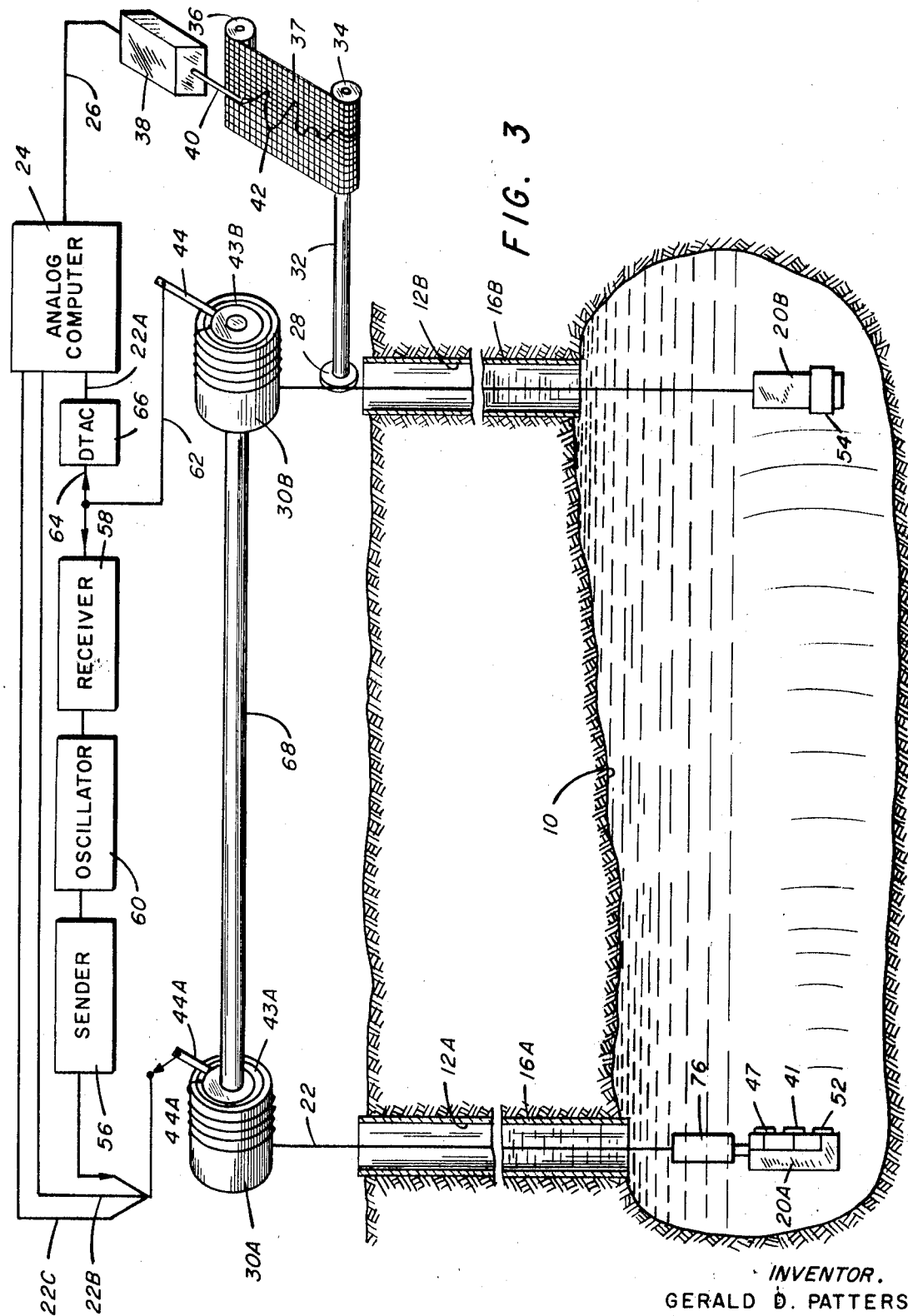
FIG. 3 is a diagrammatic representation of an alternate arrangement for practicing the method of this invention particularly applicable for measuring the level of concentration of a solution in an underground cavern having spaced openings therein communicating with the earth's surface.

FIG. 3 shows an alternate embodiment of the invention. Many solution mining operations utilize spaced wells indicated by numerals 12A and 12B penetrating the strata being mined. In typical operation water, or other solvent, is injected into one of the wells and the solution formed by a dissolved portion of the strata is taken out of the opposite well. To obtain more accurate measurement of levels of concentration in this type of mining the concentration is best obtained as an average of that existing between one well borehole and the other. In the embodiment of FIG. 3 two drums 30A and 30B are utilized connected to each other by a shaft 68 or some other arrangement providing for uniform rotation of drums 30A and 30B. In borehole 12A is suspended test instrument 20A which includes the pressure transponder 41, temperature transponder 47, and speed of sound-transmitting element 52. In the borehole 12B instrument 20B is suspended which includes speed of sound-receiving element 54. The speed of sound transmission is then determined between the transmitting element 52 and the receiving element 54 with the sender 56, receiver 58, and oscillator 60 preferably located at the earth's surface, although it can be seen that such elements may be located either in instrument 20A or 20B. In the arrangement of FIG. 3 the transmitting element 52 and receiving element 54 will normally be much further apart than in the arrangement of FIG. 2 and therefore the normal frequency of oscillator 60 will be much lower.

In the arrangement of FIG. 3 instruments 20A and 20B are simultaneously lowered or raised in the cavern to provide a graphical indication 42 of the level of concentration in the cavern according to elevation.

In the arrangement of FIG. 3 the pressure transponder 41 and temperature transponder 47 are illustrated as being a part of instrument 20A although obviously they could equally as well be a part of instrument 20B. A further refinement would include positioning a temperature transponder in each instrument 20A and 20B with the analog signal being the average of the two to more accurately reflect the average temperature at the various elevations at which the instruments are positioned during the taking of records. The same could be said of the pressure transponder 47 although obviously the pressure would always be the same in any elevation regardless of whether the pressure reading was taken at instrument 20A or 20B.

In an arrangement of FIG. 3 the pulse repetition frequency established by the speed of sound system is easily convertible into an analog signal representative of the speed of sound transmission of the solution since the distances between the wells 12A and 12B, and therefore instruments 20A and 20B, will either be known or can be easily determined.

In the arrangement of FIG. 2 the means of establishing a pulse repetition frequency proportional to the speed of sound transmission of the solution is shown utilizing a sending crystal 52 and receiving crystal 54. It can be seen that another embodiment includes the use of a reflective element in place of receiving crystal 54 with the crystal 52 being utilized as a combination sending and receiving element. This known procedure for determining the speed of sound transmission of fluids by establishing a pulse repetition rate signal between a crystal element and a spaced reflective surface may be applied to the practice of the present invention.

In some chemical solutions the speed of sound transmission is not drastically effected by variations in temperature and pressure. Therefore, in some applications, the analog signals representative of the pressure and temperature may be fed to analog computer 24 as manually selectable signals in which event only the speed of sound transmission must be determined from actual measurement of the solution under test. This is particularly true when the invention is utilized in determining levels of concentrations in chemical processes, including chemical manufacturing facilities wherein the temperature and pressure at various points in the system may vary only slightly.

While the invention has been described including analog computer means it can be seen that the same principles may be employed utilizing digital means or a combination of digital and analog computation and readout. While cable 22 has been described as being multiconductor as a means of conveying the signals from the different instruments to the surface such is not a necessary requirement. Any common means of transferring multichannel information on a single conductor would function as well.

When the invention is utilized to record levels of concentration in a process, such as a chemical plant, drive roller 34 may be moved by a clock, flow meters, or otherwise, to provide a chart 37 showing levels of the concentration relative to time, flow rates, etc.

While the invention has been described with a certain degree of particularity it is manifest that many changes may be made in the details of construction, the arrangement of components, and the steps of practicing the invention without departing from the spirit and the scope thereof.

What is claimed:

1. A method of determining the chemical concentration of a solution, comprising the steps of:

establishing a self-regenerated sound pulse repetition signal between spaced points in the solution, the frequency of the pulse repetition signal being proportional to the speed of sound transmission of the solution;

converting said pulse repetition signal to a speed of sound analog signal;

conveying the speed of sound analog signal to an analog computer device;

measuring the temperature of the solution;

conveying the temperature measurement to said computing device;

measuring the hydrostatic pressure of the solution;

conveying the pressure measurement to said computing device; and computing the concentration of said solution in said computing device by application of empirical formula.

2. A method of plotting the concentration of a solution in a container relative to depth comprising:

moving a test instrument elevationally in said container;

establishing in the test instrument a self-regenerated sound pulse repetition signal between spaced points in the solution, the frequency of the pulse repetition signal being proportional to the speed of sound transmission of the solution;

converting said pulse repetition signal to a speed of sound analog signal;

conveying the speed of sound analog signal to an analog computer device;

measuring in said test instrument the temperature of the solution;

conveying the temperature measurement to said computing device;

measuring in said test instrument the hydrostatic pressure of the solution;

conveying the pressure measurement to said computing device;

computing the concentration of said solution in said computing device by application of empirical formula to obtain an analog signal representative of the solution concentration;

moving a recording medium relative to a writing device in synchronization with the elevation of said test instrument; and conveying said solution concentration analog signal to said writing device.

3. A means of determining the chemical concentration of a solution comprising:

sound transmitting and receiving elements supported in the solution providing means of transmitting and receiving sound pulses through preselected distance in the solution;

a sound transmitter connected to said sound transmitting and receiving elements including means of applying sound-producing voltage pulses to said transmitting and receiving elements in response to sound pulses received through the solution to establish a regenerated pulse repetition frequency signal proportional to the speed of sound transmission of the solution;

a digital-to-analog converter connected to receive said regenerated signal pulses and convert the same into an analog signal proportional to the speed of sound transmission of the solution;

a temperature-measuring means supported in the solution providing an analog signal representative of the solution temperature;

a hydrostatic pressure measuring means supported in the solution providing an analog signal representative of the solution pressure; and an analog computer connected to receive the speed of sound, temperature and pressure analog signals including means of computing from these signals by empirical formula the solution concentration.

4. An apparatus for plotting the concentration of a solution in a container relative to depth comprising:

a test instrument supported in the solution;

means of elevationally positioning the test instrument;

sound transmitting and receiving elements supported by said test instrument in the solution providing means of transmitting and receiving sound pulses through preselected distance in the solution;

a sound transmitter connected to said sound transmitting and receiving elements including means of applying sound producing voltage pluses to said transmitting and receiving elements in response to sound pulse received through the solution to establish a regenerated pulse repetition frequency signal proportional to the speed of sound transmission of the solution;

a digital-to-analog converter connected to receive said regenerated signal pulses and convert the same into an analog signal proportional to the speed of sound transmission of the solution;

a temperature-measuring means supported in the solution providing an analog signal representative of the solution temperature;

a hydrostatic pressure measuring means supported in the solution providing an analog solution representative of the solution pressure;

an analog computer connected to receive the speed of sound, temperature and pressure analog signals including means of computing from these signals by empirical formula the solution concentration providing an analog signal output representative of the solution concentration;

a recording medium including a writing device connected to receive the output analog signal from said computer; and means of moving said recording medium relative to said writing device in synchronization with the elevational positioning of said test instrument.

* * * * *

PO-1050
(5/69)

UNITED STATES PATENT OFFICE
CERTIFICATE OF CORRECTION

Patent No. 3,648,513      Dated 14 March 1972

Inventor(s) Gerald D. Patterson

It is certified that error appears in the above-identified patent and that said Letters Patent are hereby corrected as shown below:

Column 1, line 11, delete "one".

line 39, insert --or-- between "depth," and "so".

Column 3, line 5, delete "slipring" and insert --slip ring--.

line 66, delete "The oscillator 60".
        line 67, insert --60 functions,-- between "oscillator" and "when".
Column 7, line 10, change "pulse" to --pulses--.

Column 8, line 4, delete "solution" and insert --signal--.

Signed and sealed this 12th day of September 1972.

(SEAL)
Attest:

EDWARD M. FLETCHER, JR.          ROBERT GOTTSCHALK
Attesting Officer                  Commissioner of Patents